(12) United States Patent
Mohammad et al.

(10) Patent No.: US 11,721,024 B2
(45) Date of Patent: Aug. 8, 2023

(54) REAL-TIME MASK QUALITY PREDICTOR

(71) Applicant: Intel Corporation, Santa Clara, CA (US)

(72) Inventors: Fahim Mohammad, Beaverton, OR (US); Joseph Batz, Beaverton, OR (US); Nathan Segerlind, Beaverton, OR (US); Itay Benou, Santa Clara, CA (US); Tzachi Hershkovich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 17/489,434

(22) Filed: Sep. 29, 2021

(65) Prior Publication Data

US 2022/0020156 A1 Jan. 20, 2022

Related U.S. Application Data

(62) Division of application No. 16/457,518, filed on Jun. 28, 2019, now Pat. No. 11,164,317.

(51) Int. Cl.
| | |
|---|---|
| *G06T 7/10* | (2017.01) |
| *G06T 7/11* | (2017.01) |
| *G06N 3/08* | (2023.01) |
| *G06F 18/22* | (2023.01) |

(52) U.S. Cl.
CPC ............... *G06T 7/11* (2017.01); *G06F 18/22* (2023.01); *G06N 3/08* (2013.01); *G06T 7/10* (2017.01)

(58) Field of Classification Search
CPC ........... G06T 7/10; G06K 9/6215; G06N 3/08
See application file for complete search history.

(56) References Cited

U.S. PATENT DOCUMENTS

| | | | | |
|---|---|---|---|---|
| 10,430,946 B1* | 10/2019 | Zhou | .................... | G06N 3/0454 |
| 10,510,143 B1* | 12/2019 | Zhou | .................... | G06T 7/0012 |
| 2018/0005373 A1* | 1/2018 | Rosado-Toro | ............ | G06T 7/12 |
| 2020/0302596 A1* | 9/2020 | Yoo | ........................... | G06T 7/11 |
| 2020/0327674 A1* | 10/2020 | Yang | ........................ | G06T 7/13 |

OTHER PUBLICATIONS

Non-Final Office Action for U.S. Appl. No. 16/457,518, dated Mar. 24, 2021.
Notice of Allowance for U.S. Appl. No. 16/457,518, dated Jul. 14, 2021.
Restriction Requirement dated Jan. 22, 2021 for U.S. Appl. No. 16/457,518.

* cited by examiner

*Primary Examiner* — Fayyaz Alam
(74) *Attorney, Agent, or Firm* — Essential Patents Group, LLP

(57) ABSTRACT

An embodiment of an image processing apparatus may comprise one or more processors, memory coupled to the one or more processor to store image and mask data, and logic coupled to the one or more processors and the memory, the logic to capture a volumetric broadcast video signal in real-time and generate a sequence of frame images from the captured real-time volumetric broadcast video signal, segment an input image, which corresponds to a single frame of the sequence of frame images, to generate a mask image associated with the input image, and determine a mask quality score based on the input image and the associated mask image in real-time. Other embodiments are disclosed and claimed.

20 Claims, 7 Drawing Sheets

REAL-TIME MASK QUALITY PREDICTOR

CLAIM FOR PRIORITY

This application is a divisional of, and claims the benefit of priority to U.S. patent application Ser. No. 16/457,518, filed on Jun. 28, 2019, titled "REAL-TIME MASK QUALITY PREDICTOR", and which is incorporated by reference in its entirety.

BACKGROUND

In machine vision applications, image segmentation may refer to partitioning an image into segments, such as sets of pixels which all belong to the same segment. Image segmentation is useful for many different image analysis applications. For example, image segmentation may be useful to separate the foreground of a digital image from the background, to identify objects in a digital image, to locate edges, boundaries, or contours in an image, among many other useful applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
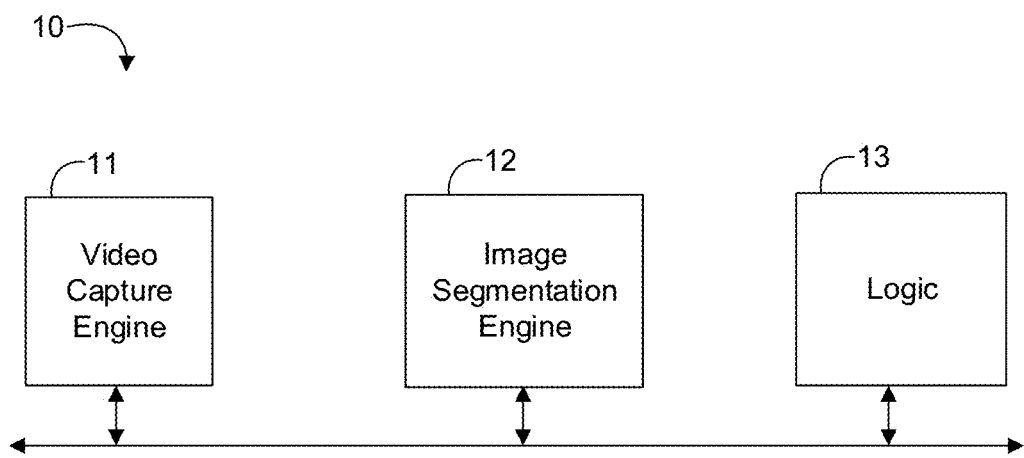
FIG. 1 is a block diagram of an example of an image processing system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to image processing systems. More particularly, embodiments relate to a real-time mask quality predictor (MQP).

With reference to FIG. 1, an embodiment of an image processing system 10 may include a video capture engine 11 to capture a volumetric broadcast video signal in real-time and generate a sequence of frame images from the captured real-time volumetric broadcast video signal, an image segmentation engine 12 to segment an input image, which corresponds to a single frame of the sequence of frame images, to generate a mask image associated with the input image, and logic 13 coupled to the image segmentation engine and the video capture engine to determine a mask quality score based on the input image and the associated mask image in real-time. For example, the logic 13 may include a neural network trained to take the input image and associated mask image as inputs to the neural network and provide the mask quality score as an output of the neural network. In some embodiments, the neural network is trained based on a set of reference input images, a set of degraded mask images, and a set of quality scores. In some embodiments, a frame splitter may split the sequences of frame images into individual frames. An individual frame is provided to the image segmentation engine 12 to generate the mask image. The individual frame and its corresponding generated mask image are provided to the trained neural network to predict the mask quality score.

Embodiments of each of the above video capture engine 11, image segmentation engine 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. The term engine refers to a collection of electronic components and/or software configured to implement the function of the engine. For example, the video capture engine 11 may include cameras, sensors, image processors, memory, power supplies, and/or any other suitable technology to capture a real-time volumetric broadcast video signal. For example, the image segmentation engine may include trained neural networks, processors, memory, power supplies, and/or any other suitable technology to segment an input image.

In some embodiments, the video capture engine 11, image segmentation engine 12, logic 13, and other system components may be located in, or co-located with, each other or various other components, including a processor (e.g., on a same die). For example, the logic 13 may be implemented on a semiconductor apparatus which may include one or more substrates, with the logic 13 coupled to the one or more substrates. In some embodiments, the logic 13 may be at least partly implemented in one or more of configurable logic and fixed-functionality hardware logic on semiconductor substrate(s) (e.g., silicon, sapphire, gallium-arsenide, etc.). For example, the logic 13 may include a transistor array and/or other integrated circuit components coupled to the substrate(s) with transistor channel regions that are positioned within the substrate(s). The interface between the logic 13 and the substrate(s) may not be an abrupt junction. The logic 13 may also be considered to include an epitaxial layer that is grown on an initial wafer of the substrate(s).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, memory, persistent storage media, or other system memory may store a set of instructions which when executed by a processor cause the system 10 to implement one or more components, features, or aspects of the system 10 (e.g., the logic 13, etc.).

Figure 2:
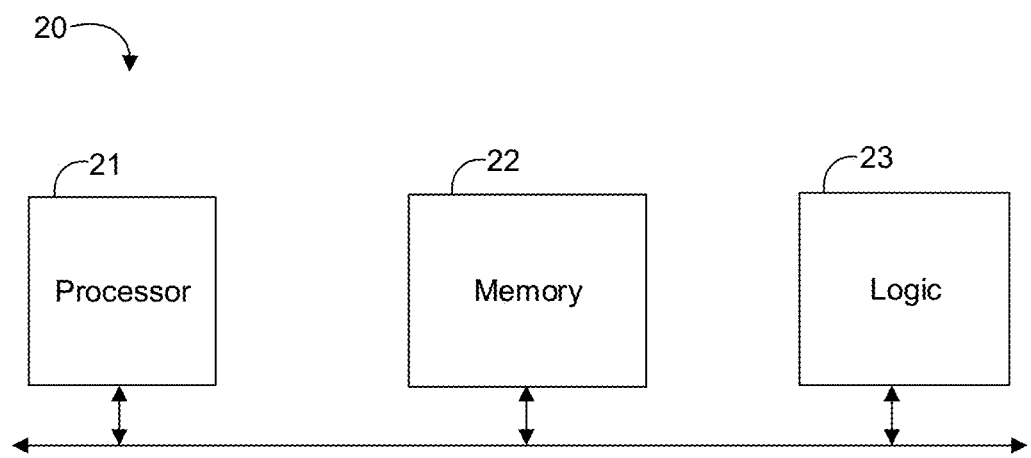
FIG. 2 is a block diagram of an example of an electronic system according to an embodiment.

With reference to FIG. 2, an embodiment of an electronic system 20 may include a memory 22 to store a set of input images and a reference mask image associated with each input image of the set of input images, a processor 21 communicatively coupled to the memory 22, and logic 23 communicatively coupled to the processor 21 and the memory 22. The logic 23 may be configured to generate a set of two or more masks of different quality associated with each input image of the set of input images, and determine a quality score for each generated mask. For example, the logic 23 may be configured to generate at least one mask of the set of masks with a first segmentation model, and generate at least one mask of the set of masks with a second segmentation model which is different from the first segmentation model. Additionally, or alternatively, the logic 23 may be configured to generate at least one mask of the set of masks with a first set of parameters for a segmentation model, and generate at least one mask of the set of masks with a second set of parameters for the segmentation model which is different from the first set of parameters.

In some embodiments, the logic 23 may be further configured to determine the quality score for each generated mask based on a comparison of the generated mask associated with an input image and the reference mask associated with the input image. For example, the comparison may be based on a Dice similarity coefficient. In some embodiments, the logic 23 may be further configured to train a neural network to predict quality scores based on a training data set that includes the set of input images, the set of two or more generated masks associated with each input image, and the quality score for each of the generated masks.

Embodiments of each of the above processor 21, memory 22, logic 23, and other system components may be implemented in hardware, software, or any suitable combination thereof. For example, hardware implementations may include configurable logic such as, for example, PLAs, FPGAs, CPLDs, or fixed-functionality logic hardware using circuit technology such as, for example, ASIC, CMOS or TTL technology, or any combination thereof. Embodiments of the processor 21 may include a general purpose processor, a special purpose processor, an image processor, a graphic processor, a microarchitecture, a kernel, an execution unit, a general purpose controller, a special purpose controller, a micro-controller, etc.

In some embodiments, the memory 22 and/or the logic 23, may be located in, or co-located with, various components, including the processor 21 (e.g., on a same die). For example, the logic 23 may be implemented on a semiconductor apparatus which may include one or more substrates, with the logic 23 coupled to the one or more substrates. In some embodiments, the logic 23 may be at least partly implemented in one or more of configurable logic and fixed-functionality hardware logic on semiconductor substrate(s) (e.g., silicon, sapphire, gallium-arsenide, etc.). For example, the logic 23 may include a transistor array and/or other integrated circuit components coupled to the substrate(s) with transistor channel regions that are positioned within the substrate(s). The interface between the logic 23 and the substrate(s) may not be an abrupt junction. The logic 23 may also be considered to include an epitaxial layer that is grown on an initial wafer of the substrate(s).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 22, persistent storage media, or other system memory may store a set of instructions which when executed by the processor 21 cause the system 20 to implement one or more components, features, or aspects of the system 20 (e.g., the logic 23, generating a set of two or more masks of different quality associated with each input image of the set of input images, determining a quality score for each generated mask, etc.).

Figure 3:
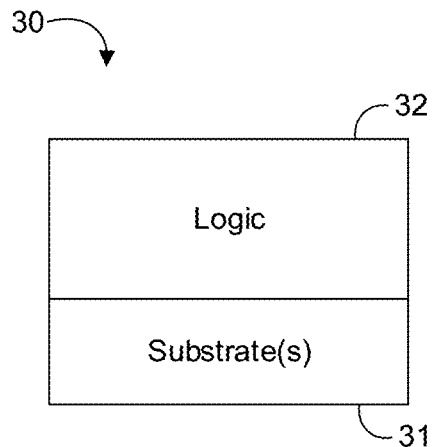
FIG. 3 is a block diagram of an example of an image processing apparatus according to an embodiment.

Turning now to FIG. 3, an embodiment of an image processing apparatus 30 may include one or more substrates 31, and logic 32 coupled to the one or more substrates 31. The logic 32 may be configured to generate a set of two or more masks of different quality associated each input image of a set of input images, and determine a quality score for each generated mask. For example, the logic 32 may be configured to generate at least one mask of the set of masks with a first segmentation model, and generate at least one mask of the set of masks with a second segmentation model which is different from the first segmentation model. Additionally, or alternatively, the logic 32 may be configured to generate at least one mask of the set of masks with a first set of parameters for a segmentation model, and generate at least one mask of the set of masks with a second set of parameters for the segmentation model which is different from the first set of parameters.

In some embodiments, the logic 32 may be further configured to determine the quality score for each generated mask based on a comparison of the generated mask associated with an input image and a reference mask associated with the input image. For example, the comparison may be based on a Dice similarity coefficient. In some embodiments, the logic 32 may be further configured to train a neural network to predict quality scores based on a training data set that includes the set of input images, the set of two or more generated masks associated with each input image, and the quality score for each of the generated masks.

Embodiments of logic 32, and other apparatus components may be implemented in hardware, software, or any suitable combination thereof. For example, hardware implementations may include configurable logic such as, for example, PLAs, FPGAs, CPLDs, or fixed-functionality logic hardware using circuit technology such as, for example, ASIC, CMOS or TTL technology, or any combination thereof. In some embodiments, the logic 32, may be located in, or co-located with, various components, including a processor (e.g., on a same die). For example, the one or more substrates 31 may include a semiconductor substrate(s) (e.g., silicon, sapphire, gallium-arsenide, etc.). For example, the logic 32 may include a transistor array and/or other integrated circuit components coupled to the substrate(s) 31 with transistor channel regions that are positioned within the substrate(s) 31. The interface between the logic 32 and the substrate(s) 31 may not be an abrupt junction. The logic 32 may also be considered to include an epitaxial layer that is grown on an initial wafer of the substrate(s) 31.

Figure 4A:
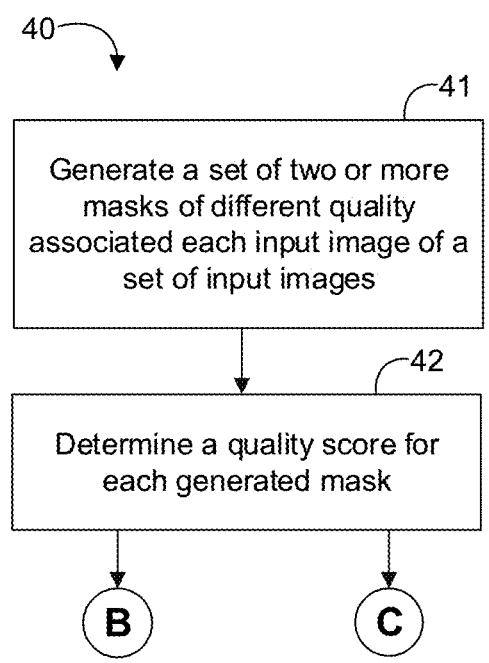
FIGS. 4A to 4C are flowcharts of an example of a method of processing an image according to an embodiment.
Figure 4B:
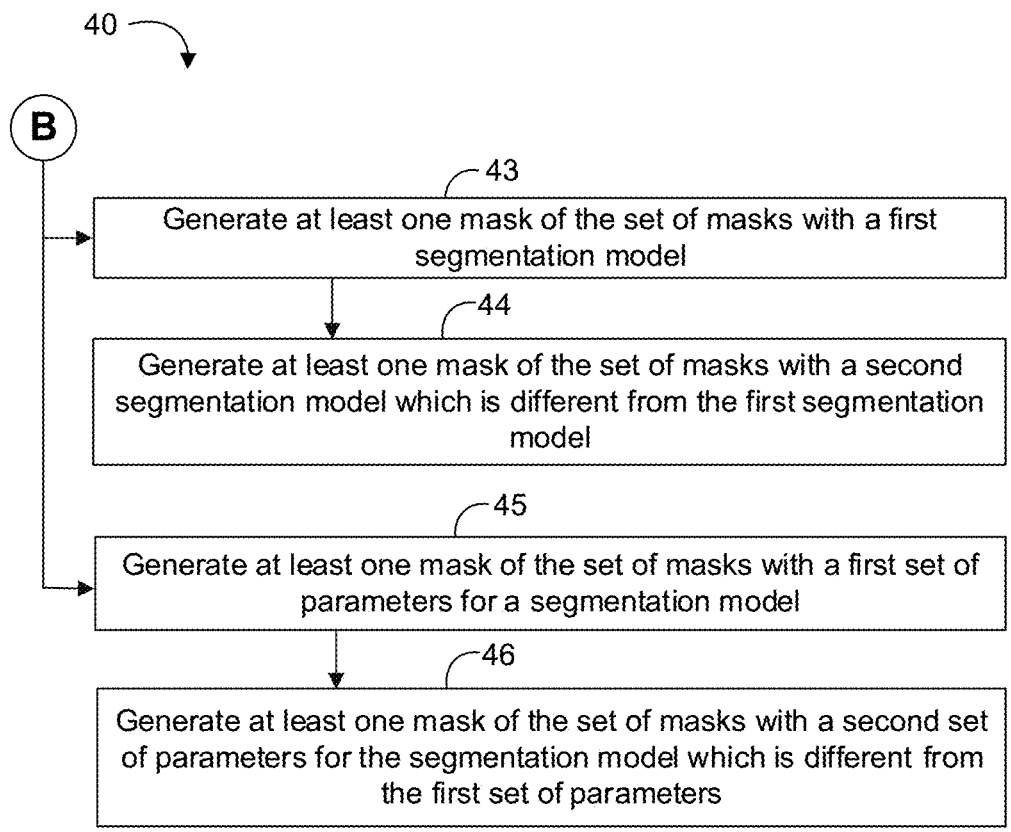
Figure 4C:
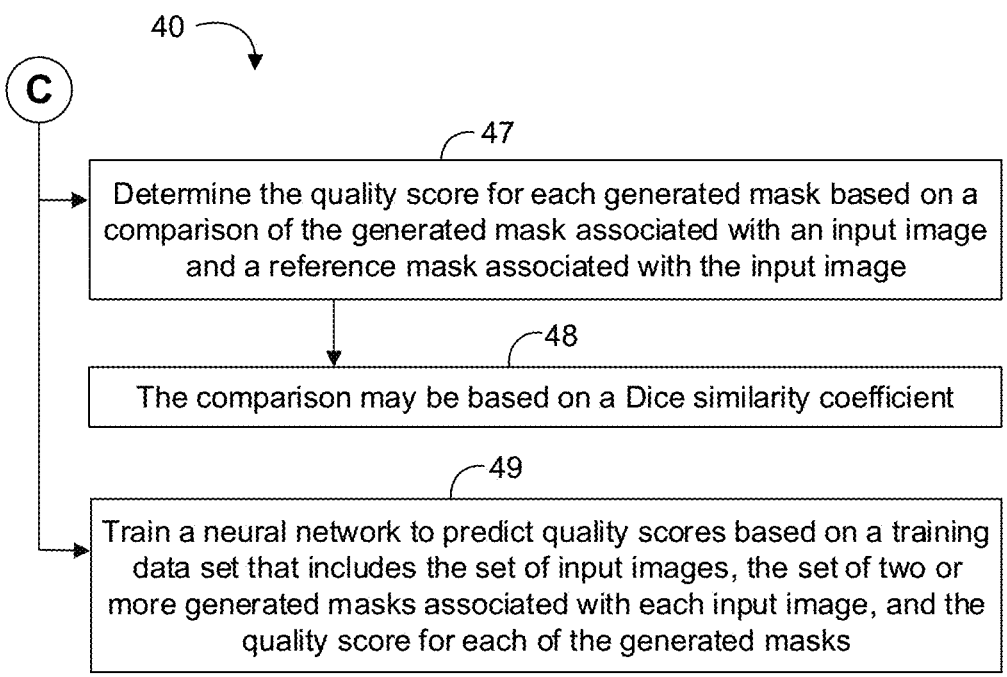

Turning now to FIGS. 4A to 4C, an embodiment of a method 40 of processing an image may include generating a set of two or more masks of different quality associated each input image of a set of input images at block 41, and determining a quality score for each generated mask at block 42. For example, the method 40 may include generating at least one mask of the set of masks with a first segmentation model at block 43, and generating at least one mask of the set of masks with a second segmentation model which is different from the first segmentation model at block 44. Additionally, or alternatively, the method 40 may include generating at least one mask of the set of masks with a first set of parameters for a segmentation model at block 45, and generating at least one mask of the set of masks with a second set of parameters for the segmentation model which is different from the first set of parameters at block 46.

Some embodiments of the method 40 may further include determining the quality score for each generated mask based on a comparison of the generated mask associated with an input image and a reference mask associated with the input image at block 47. For example, the comparison may be based on a Dice similarity coefficient at block 48. Some embodiments of the method 40 may further include training a neural network to predict quality scores based on a training data set that includes the set of input images, the set of two or more generated masks associated with each input image, and the quality score for each of the generated masks at block 49.

Embodiments of the method 40 may be implemented in a system, apparatus, computer, device, etc., for example, such as those described herein. More particularly, hardware implementations of the method 40 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 40 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 40 may be implemented on a computer readable medium as described in connection with Examples 22 to 27 below. Embodiments or portions of the method 40 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology to automatically measure the quality of an image segmentation mask in the absence of reference mask. Separating image foreground from background (e.g., sometimes referred to as image segmentation) is an important step in many computer vision tasks. Monitoring the quality of the segmentations generated by software and/or hardware is a valuable quality control mechanism. Some embodiments advantageously provide a MQP module, which may include technology to automatically predict the quality of an image segmentation in real time without comparing against a reference segmentation. In some embodiments, the MQP module may advantageously characterize a mask a) without any reference, b) without human intervention, and c) in real time.

In some embodiments, the MQP module may include a neural network trained to provide mask quality scores. For example, some embodiments may train the MQP neural network by having a user provide reference images with ground truth segmentation masks and, from the provided reference images, generate a collection of additional reference images with masks of varying quality and known quality scores. For example, the additional reference images may be generated by running various segmentation algorithms over the images with a variety of hyperparameters to generate masks of a wide range of qualities, and then evaluating the generated masks against the user provided reference images. A neural network regression model to predict quality scores from images and masks may then be trained using this collection of reference images with masks of varying quality and known quality scores.

At deployment time, some embodiments require neither a reference segmentation nor human intervention to decide on the quality of a segmentation mask, and the run time analysis may be executed in real time. Numerous image processing applications may benefit from embodiments of the MQP technology described herein. Non-limiting examples of volumetric video may include utilizing multiple cameras to capture content in three dimensions, but may differ from standard 360° or VR video in that volumetric video is captured from the outside, in. For example, because image segmentation is an important step in volumetric broadcast, an appropriately utilized embodiment of an MQP module may enable a user/developer/service provider/etc. to better monitor quality in real-time during volumetric broadcast. In a real-time volumetric broadcast, for example, image segmentation may be utilized to separate the background of the video (e.g., stationary elements, the field, the goal, etc.) from the foreground of the video (e.g., elements in motion such as the players, the ball, etc.).

Other non-limiting examples of applications for image segmentation which may benefit from embodiments of the MQP technology include software, dashboards, loggers, quality reporting tools, or similar other tools. For example, embodiments of an MQP module may enable one or more of the following tools: A tool which accepts a raw image as input and generates a segmentation mask along with quality score without a reference mask to use as ground truth; A tool which consumes a stream of raw images and produces a stream of segmentation masks with quality scores to monitor the quality of the segmentations being made; A tool that takes an image and a mask and outputs a score or produces an output that explicitly or implicitly indicates the quality of the generated mask; A tool that choses one segmentation algorithm from a pool of many segmentation algorithms; A tool that chooses the best segmentation mask from many segmentation masks generated. Advantageously, embodiments of such tools may perform quality estimation for image segmentation without reference to ground truth, and in real-time. Embodiments of such tools may utilize artificial intelligence, and/or neural networks, for evaluating segmentation quality.

One useful application of image segmentation includes the separation of an image into foreground and background. Such separation is an important task in computer vision, and is also important to the real-time broadcasting of volumetric content. Typically, the result of such image segmentation is a mask, which may correspond to an image of the same dimensions as the input image in which the foreground content is preserved and the background content has been set to black. Image segmentation is generally a resource intensive problem. When run in resource constrained environments or when encountering unanticipated images, even the best segmentation algorithms can produce low quality masks. In streaming volumetric broadcast, where the foreground of an image are the humans portrayed in the image, poor quality segmentation masks result in the volumetric broadcast of humans with missing limbs, or extra blobs protruding from their bodies. This is a poor end-user experience, and monitoring of generated segmentation mask quality is an important quality control step.

Conventionally, two approaches are usually employed to determine mask quality: a) Subjectively scoring each of the masks generated; and b) Evaluating mask quality based on the manually painted masks with the help of different metrics. However, none of the methods are feasible in the real-time broadcasting scenario as manual involvement is tedious and time consuming.

To address these challenges, some embodiments provide technology that can automatically evaluate the quality of the generated masks automatically in real-time. Some embodiments may first generate a set of data which includes: 1) sample images; 2) a collection of masks of varying quality for each sample image; and 3) corresponding scores for each mask associated with each sample image. Based on the generated set of data, a MQP module may be constructed to analyze an input image and a mask associated with the input image, and output a quality score for the mask. The appropriately configured MQP module may then be deployed to provide real-time mask quality scores in an image processing application (e.g., computer vision, volumetric broadcasting, etc.).

Artificial Intelligence Examples

Some embodiments may advantageously utilize artificial intelligence technology such as neural networks. For example, the set of data may be generated to utilize as training data for a neural network. The neural network may be appropriately trained with the training data to function as a MQP module which takes an input image and an associated mask as inputs to the neural network and provides a quality score for the associated mask as an output of the neural network. The neural network may then be deployed in a wide variety of image processing applications to provide real-time mask quality scores.

Figure 5:
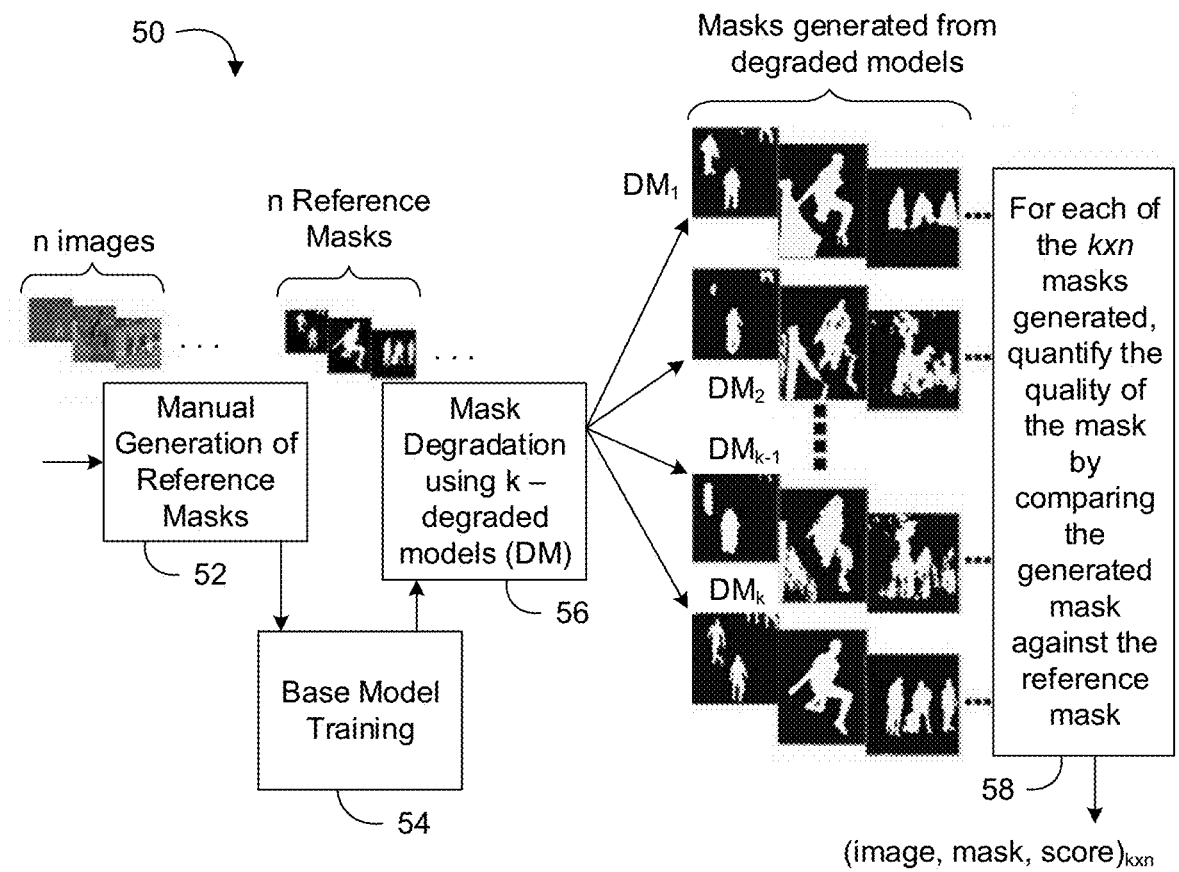
FIG. 5 is an illustrative diagram of an example of a process for generating a set of data according to an embodiment.

With reference to FIG. 5, an embodiment of a process 50 for generating a set of data illustrates generation of training data by purposely degrading the reference masks. At block 52, a number (e.g., n; n>1) of raw color images from a camera are painted manually to provide a reference mask for each image. At block 54, a base model ($M_b$) is generated from some semantic segmentation algorithm by training the base model on the manually generated reference masks. The base model $M_b$ is then deliberately deteriorated to generate degraded models ($DM_1$ through $DM_k$; k>1). For example, the degraded models may be generated by tuning various parameters of the base model $M_b$ (e.g., number of epochs, learning rate etc.) of the neural network or segmentation algorithm. Utilizing the degraded models, imperfect masks of varying quality are generated at block 56.

At block 58, quality scores for each image and mask pair may be determined, based on the manually painted reference masks for the images. The images, generated masks, and determined quality scores may then later be utilized used for training. Assuming the initial number of labeled images to be n and the number of degraded models being used to be k, for example, the data set will include a total of k×n image, masks and score tuples. To generate the data set, each of these k×n masks may be compared against the corresponding manually painted reference masks (e.g., ground truth), to determine the quality scores of all k×n masks. Some embodiments may utilize a metric score such as a Dice similarity coefficient, but any suitable metric/techniques may be utilized that returns a real value determined by comparing a candidate segmentation against the ground truth (e.g., Hausdorff distance, etc.). The generated dataset may then be utilized as the training data, validation data, and holdout/test data to train neural network (e.g., a convolutional neural network (CNN), a deep learning (DL) CNN, etc.) as a MQP module.

Figure 6:
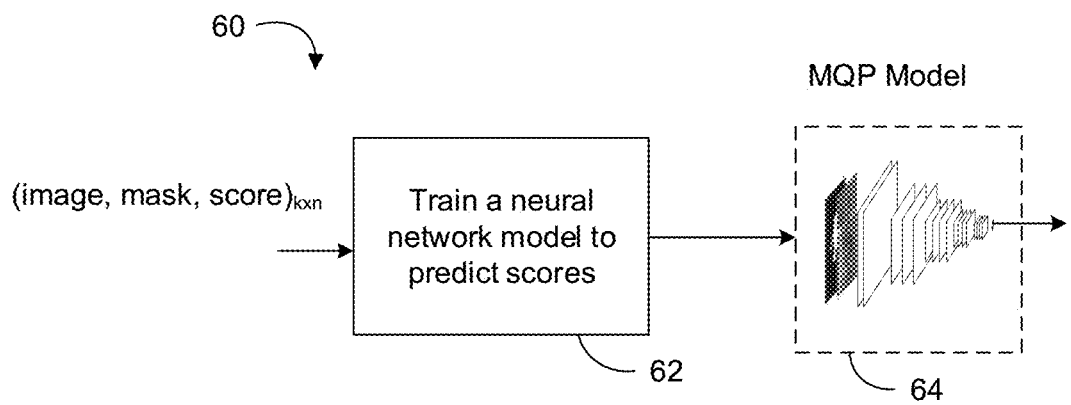
FIG. 6 is an illustrative diagram of an example of a process for constructing a map quality predictor module according to an embodiment.

With reference to FIG. 6, an embodiment of a process 60 for constructing a MQP module includes training a neural network model at block 62 with a subset of k×n image, mask and the corresponding scores. Instead of training with three color (e.g., red, green, and blue (RGB)) channels, some embodiments utilized four channels (e.g., RGB and the associated mask as the fourth channel). The input to the training algorithm includes the (image, mask) pair and the output is the quality score. Following training, a trained neural network with a MQP model is ready for deployment at block 64.

Figure 7A:
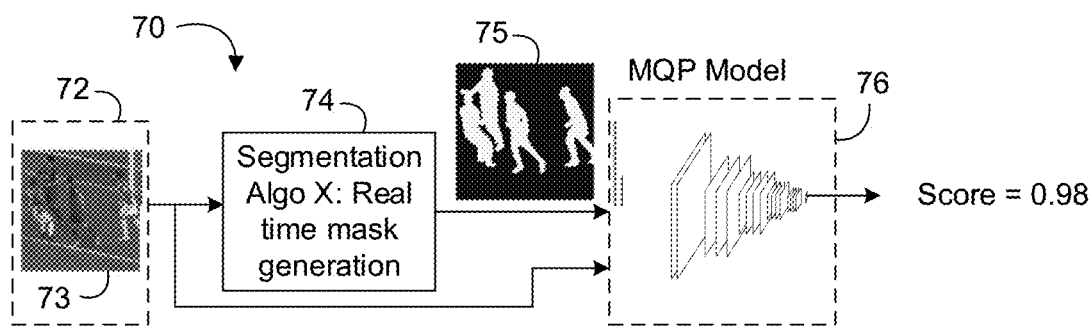
FIGS. 7A to 7B are block diagrams of another example of an image processing system according to an embodiment.
Figure 7B:
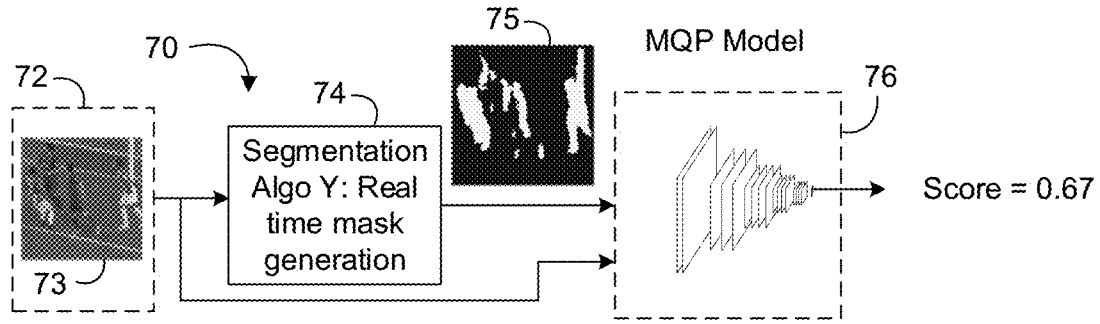

With reference to FIGS. 7A to 7B, embodiments show an example system 70 where, after the neural network is trained, the MQP model may advantageously be utilized for inference in real-time. In this example application, a sequence of frames is generated from real-time video capture system 72 and provided to a segmentation model engine 74, which outputs a mask for each frame. The actual frame image 73 and the segmentation mask 75 are provided as inputs to the MQP model 76, which generates and outputs the quality score for each frame in real-time. In FIG. 7A, the segmentation model engine 74 utilizes algorithm X, which produces a higher quality score as compared to algorithm Y utilized in FIG. 7B. With real-time determination of such quality scores, the system 70 may advantageously make corresponding real-time adjustments as needed. For example, predicted poor quality segmentation may be excluded from the broadcast (e.g., or from re-broadcasts such as replays). In another example, in response to a predicted mask quality that is lower than a threshold the system 70 may reduce the frame rate (e.g., from 40 frames per second (fps) to 30 fps) and select a more compute intensive algorithm to improve the image segmentation quality (e.g., that takes a little longer but has better results).

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
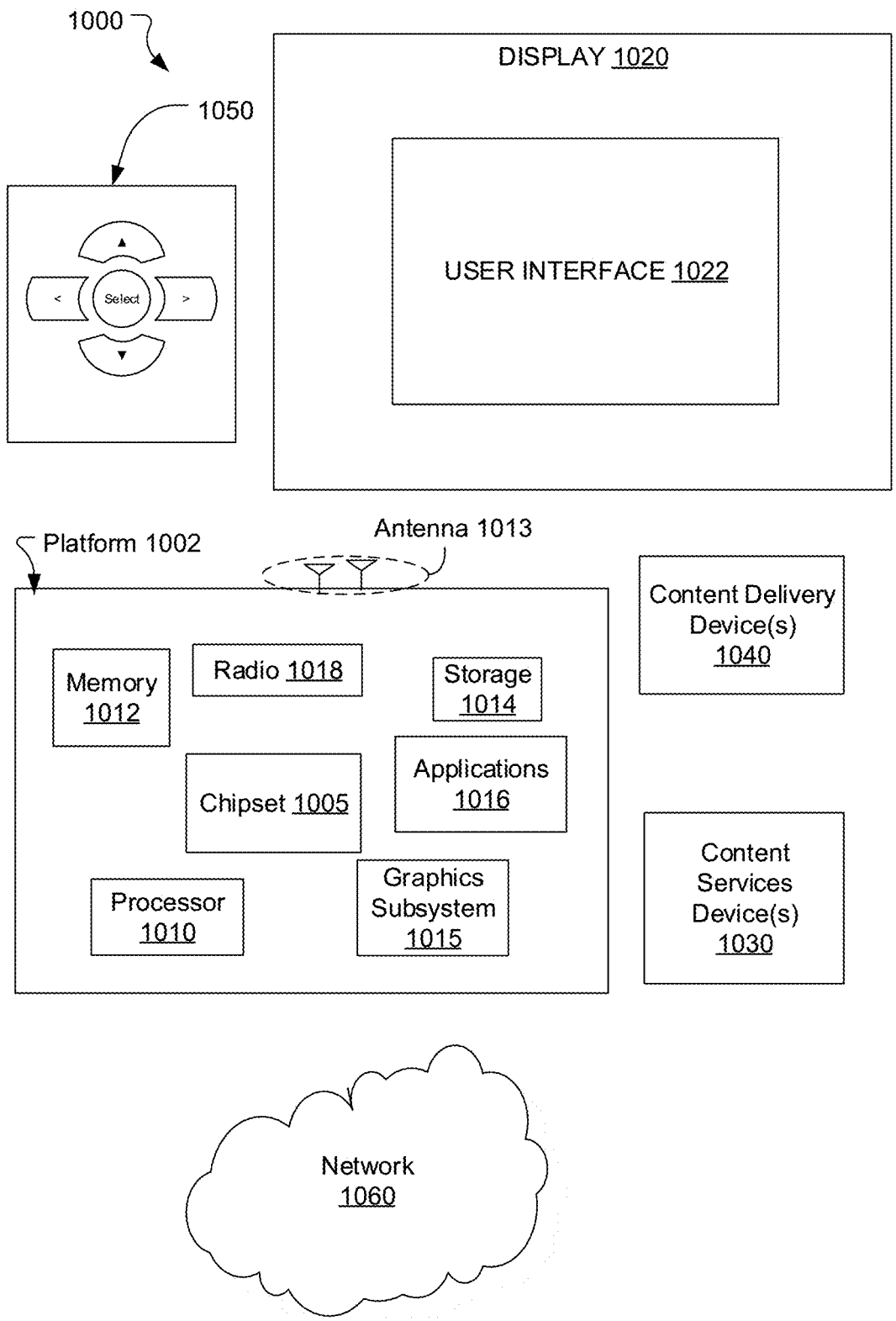
FIG. 8 is an illustrative diagram of an example system.

FIG. 8 is an illustrative diagram of an example system 1000, arranged in accordance with at least some implementations of the present disclosure. In various implementations, system 1000 may be a mobile system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of may be used to interact with user interface 1022, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In various embodiments, may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
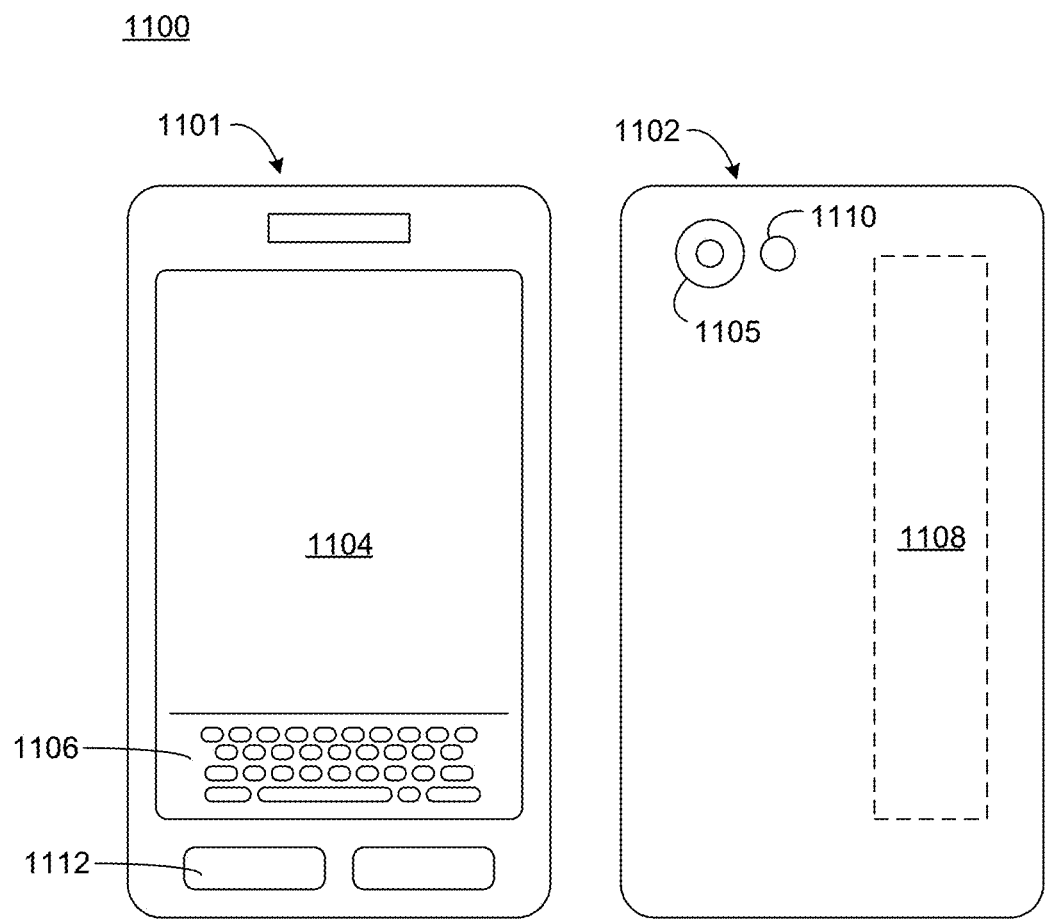
FIG. 9 illustrates an example small form factor device, all arranged in accordance with at least some implementations of the present disclosure.

As described above, system 1000 may be embodied in varying physical styles or form factors. FIG. 9 illustrates an example small form factor device 1100, arranged in accordance with at least some implementations of the present disclosure. In some examples, system 1000 may be implemented via device 1100. In other examples, system 1000 or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

The system 1000 and/or the device 1100 may include one or more features or aspects of the various embodiments described herein, including those described in the following examples.

ADDITIONAL NOTES AND EXAMPLES

Example 1 includes an image processing system, comprising a video capture engine to capture a volumetric broadcast video signal in real-time and generate a sequence of frame images from the captured real-time volumetric broadcast video signal, an image segmentation engine to segment an input image, which corresponds to a single frame of the sequence of frame images, to generate a mask image associated with the input image, and logic coupled to the image segmentation engine and the video capture engine to determine a mask quality score based on the input image and the associated mask image in real-time.

Example 2 includes the system of Example 1, wherein the logic comprises a neural network trained to take the input image and associated mask image as inputs to the neural network and provide the mask quality score as an output of the neural network.

Example 3 includes the system of any of Examples 1 to 2, wherein the neural network is trained based on a set of reference input images, a set of degraded mask images, and a set of quality scores.

Example 4 includes an electronic system, comprising a memory to store a set of input images and a reference mask image associated with each input image of the set of input images, a processor communicatively coupled to the memory, and logic communicatively coupled to the processor and the memory, the logic to generate a set of two or more masks of different quality associated with each input image of the set of input images, and determine a quality score for each generated mask.

Example 5 includes the system of Example 4, wherein the logic is further to generate at least one mask of the set of masks with a first segmentation model, and generate at least one mask of the set of masks with a second segmentation model which is different from the first segmentation model.

Example 6 includes the system of any of Examples 4 to 5, wherein the logic is further to generate at least one mask of the set of masks with a first set of parameters for a segmentation model, and generate at least one mask of the set of masks with a second set of parameters for the segmentation model which is different from the first set of parameters.

Example 7 includes the system of any of Examples 4 to 6, wherein the logic is further to determine the quality score for each generated mask based on a comparison of the generated mask associated with an input image and the reference mask associated with the input image.

Example 8 includes the system of Example 7, wherein the comparison is based on a Dice similarity coefficient.

Example 9 includes the system of any of Examples 7 to 8, wherein the logic is further to train a neural network to predict quality scores based on a training data set that includes the set of input images, the set of two or more generated masks associated with each input image, and the quality score for each of the generated masks.

Example 10 includes an image processing apparatus, comprising one or more substrates, and logic coupled to the one or more substrates, the logic to generate a set of two or more masks of different quality associated each input image of a set of input images, and determine a quality score for each generated mask.

Example 11 includes the apparatus of Example 10, wherein the logic is further to generate at least one mask of the set of masks with a first segmentation model, and generate at least one mask of the set of masks with a second segmentation model which is different from the first segmentation model.

Example 12 includes the apparatus of any of Examples 10 to 11, wherein the logic is further to generate at least one mask of the set of masks with a first set of parameters for a segmentation model, and generate at least one mask of the set of masks with a second set of parameters for the segmentation model which is different from the first set of parameters.

Example 13 includes the apparatus of any of Examples 10 to 12, wherein the logic is further to determine the quality score for each generated mask based on a comparison of the generated mask associated with an input image and a reference mask associated with the input image.

Example 14 includes the apparatus of Example 13, wherein the comparison is based on a Dice similarity coefficient.

Example 15 includes the apparatus of any of Examples 13 to 14, wherein the logic is further to train a neural network to predict quality scores based on a training data set that includes the set of input images, the set of two or more generated masks associated with each input image, and the quality score for each of the generated masks.

Example 16 includes a method of processing an image, comprising generating a set of two or more masks of different quality associated each input image of a set of input images, and determining a quality score for each generated mask.

Example 17 includes the method of Example 16, further comprising generating at least one mask of the set of masks with a first segmentation model, and generating at least one mask of the set of masks with a second segmentation model which is different from the first segmentation model.

Example 18 includes the method of any of Examples 16 to 17, further comprising generating at least one mask of the set of masks with a first set of parameters for a segmentation model, and generating at least one mask of the set of masks with a second set of parameters for the segmentation model which is different from the first set of parameters.

Example 19 includes the method of any of Examples 16 to 18, further comprising determining the quality score for each generated mask based on a comparison of the generated mask associated with an input image and a reference mask associated with the input image.

Example 20 includes the method of Example 19, wherein the comparison is based on a Dice similarity coefficient.

Example 21 includes the method of any of Examples 19 to 20, further comprising training a neural network to predict quality scores based on a training data set that includes the set of input images, the set of two or more generated masks associated with each input image, and the quality score for each of the generated masks.

Example 22 includes at least one machine readable medium comprising a plurality of instructions that, in response to being executed on a computing device, cause the computing device to generate a set of two or more masks of different quality associated each input image of a set of input images, and determine a quality score for each generated mask.

Example 23 includes the machine readable medium of Example 22, comprising a plurality of further instructions that, in response to being executed on the computing device, cause the computing device to generate at least one mask of the set of masks with a first segmentation model, and generate at least one mask of the set of masks with a second segmentation model which is different from the first segmentation model.

Example 24 includes the machine readable medium of any of Examples 22 to 23, comprising a plurality of further instructions that, in response to being executed on the computing device, cause the computing device to generate at least one mask of the set of masks with a first set of parameters for a segmentation model, and generate at least one mask of the set of masks with a second set of parameters for the segmentation model which is different from the first set of parameters.

Example 25 includes the machine readable medium of any of Examples 22 to 24, comprising a plurality of further instructions that, in response to being executed on the computing device, cause the computing device to determine the quality score for each generated mask based on a comparison of the generated mask associated with an input image and a reference mask associated with the input image.

Example 26 includes the machine readable medium of Example 25, wherein the comparison is based on a Dice similarity coefficient.

Example 27 includes the machine readable medium of any of Examples 25 to 26, comprising a plurality of further instructions that, in response to being executed on the computing device, cause the computing device to train a neural network to predict quality scores based on a training data set that includes the set of input images, the set of two or more generated masks associated with each input image, and the quality score for each of the generated masks.

Example 28 includes an image processor apparatus, comprising means for generating a set of two or more masks of different quality associated each input image of a set of input images, and means for determining a quality score for each generated mask.

Example 29 includes the apparatus of Example 28, further comprising means for generating at least one mask of the set of masks with a first segmentation model, and means for generating at least one mask of the set of masks with a second segmentation model which is different from the first segmentation model.

Example 30 includes the apparatus of any of Examples 28 to 29, further comprising means for generating at least one mask of the set of masks with a first set of parameters for a segmentation model, and means for generating at least one mask of the set of masks with a second set of parameters for the segmentation model which is different from the first set of parameters.

Example 31 includes the apparatus of any of Examples 28 to 30, further comprising means for determining the quality score for each generated mask based on a comparison of the generated mask associated with an input image and a reference mask associated with the input image.

Example 32 includes the apparatus of Example 31, wherein the comparison is based on a Dice similarity coefficient.

Example 33 includes the apparatus of any of Examples 31 to 32, further comprising means for training a neural network to predict quality scores based on a training data set that includes the set of input images, the set of two or more generated masks associated with each input image, and the quality score for each of the generated masks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An image processing system, comprising:
   a video capture engine to capture a volumetric broadcast video signal in real-time and generate a sequence of frame images from the captured real-time volumetric broadcast video signal;
   an image segmentation engine to segment an input image, which corresponds to a single frame of the sequence of frame images, to generate a mask image associated with the input image; and
   logic coupled to the image segmentation engine and the video capture engine to determine a mask quality score based on the input image and the associated mask image in real-time.

2. The system of claim 1, wherein the logic comprises:
   a neural network trained to take the input image and associated mask image as inputs to the neural network and provide the mask quality score as an output of the neural network.

3. The system of claim 2, wherein the neural network is trained based on a set of reference input images, a set of degraded mask images, and a set of quality scores.

4. The system of claim 1, wherein the logic is further to:
   make a real-time adjustment of a broadcast based on the real-time mask quality score.

5. The system of claim 4, wherein the logic is further to:
   exclude predicted poor quality segmentation from the broadcast based on the real-time mask quality score.

6. The system of claim 4, wherein the logic is further to:
   reduce a frame rate of the broadcast in response to a predicted mask quality that is lower than a threshold.

7. The system of claim 6, wherein, the logic is further to:
select a more compute intensive algorithm for the image segmentation engine in response to the predicted mask quality that is lower than the threshold.

8. An image processing apparatus, comprising:
one or more processors;
memory coupled to the one or more processor to store image and mask data; and
logic coupled to the one or more processors and the memory, the logic to:
capture a volumetric broadcast video signal in real-time and generate a sequence of frame images from the captured real-time volumetric broadcast video signal,
segment an input image, which corresponds to a single frame of the sequence of frame images, to generate a mask image associated with the input image, and
determine a mask quality score based on the input image and the associated mask image in real-time.

9. The apparatus of claim 8, wherein the logic comprises:
a neural network trained to take the input image and associated mask image as inputs to the neural network and provide the mask quality score as an output of the neural network.

10. The apparatus of claim 9, wherein the neural network is trained based on a set of reference input images, a set of degraded mask images, and a set of quality scores.

11. The apparatus of claim 8, wherein the logic is further to:
make a real-time adjustment of a broadcast based on the real-time mask quality score.

12. The apparatus of claim 11, wherein the logic is further to:
exclude predicted poor quality segmentation from the broadcast based on the real-time mask quality score.

13. The apparatus of claim 11, wherein the logic is further to:
reduce a frame rate of the broadcast in response to a predicted mask quality that is lower than a threshold.

14. The apparatus of claim 13, wherein, the logic is further to:
select a more compute intensive algorithm to segment the input image in response to the predicted mask quality that is lower than the threshold.

15. A method of processing an image, comprising:
capturing a volumetric broadcast video signal in real-time and generate a sequence of frame images from the captured real-time volumetric broadcast video signal;
segmenting an input image, which corresponds to a single frame of the sequence of frame images, to generate a mask image associated with the input image; and
determining a mask quality score based on the input image and the associated mask image in real-time.

16. The method of claim 15, further comprising:
determining the mask quality score from a neural network trained to take the input image and associated mask image as inputs to the neural network and provide the mask quality score as an output of the neural network.

17. The method of claim 15, further comprising:
making a real-time adjustment of a broadcast based on the real-time mask quality score.

18. The method of claim 17, further comprising:
excluding predicted poor quality segmentation from the broadcast based on the real-time mask quality score.

19. The method of claim 17, further comprising:
reducing a frame rate of the broadcast in response to a predicted mask quality that is lower than a threshold.

20. The method of claim 19, further comprising:
selecting a more compute intensive algorithm for segmenting the input image in response to the predicted mask quality that is lower than the threshold.

* * * * *